Aug. 6, 1946.     C. C. WILLIS     2,405,539
ENCLOSURE
Filed March 2, 1945     5 Sheets-Sheet 2

INVENTOR.
Charles C. Willis
BY
ATTORNEYS

Aug. 6, 1946.   C. C. WILLIS   2,405,539
ENCLOSURE
Filed March 2, 1945   5 Sheets-Sheet 3

INVENTOR.
Charles C. Willis
BY
ATTORNEYS

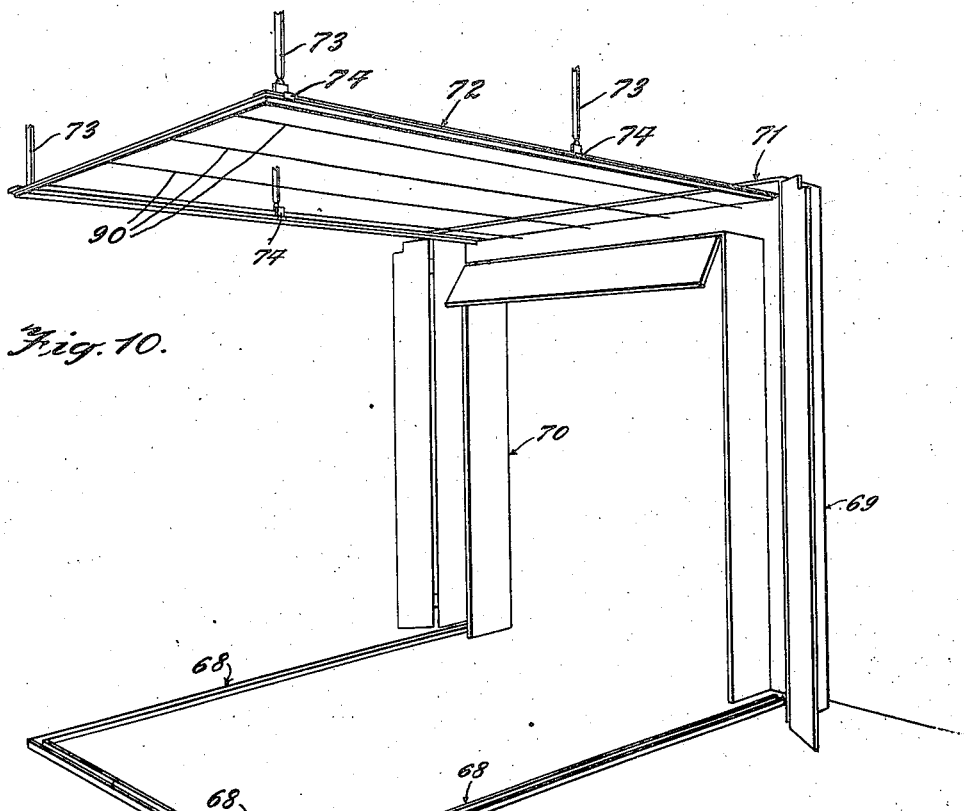
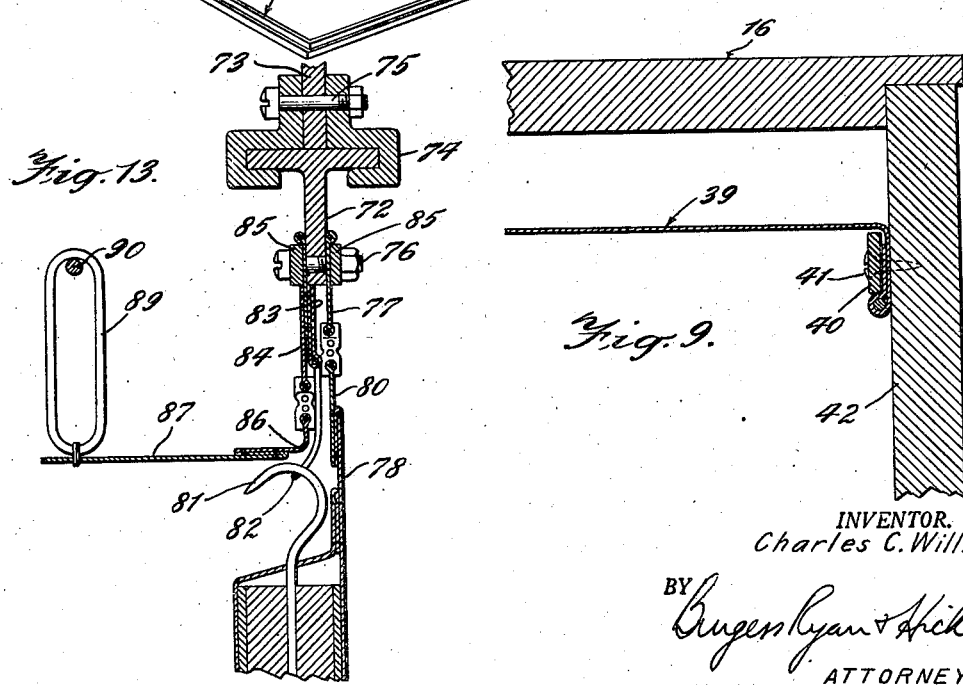

Patented Aug. 6, 1946

2,405,539

UNITED STATES PATENT OFFICE 2,405,539

ENCLOSURE

Charles C. Willis, Bound Brook, N. J., assignor to Crown Fastener Corporation, Warren, R. I., a corporation of Delaware Application March 2, 1945, Serial No. 580,669

18 Claims. (Cl. 135—5)

In the operation of certain types of retail stores, such as chain grocery stores, it frequently happens that supplies of various kinds of merchandise are more conveniently delivered to the store during the night, or early morning hours before the store is open, thus requiring that the trucker or delivery agent be furnished a key to the premises. In order to provide suitable storage space for such deliveries and at the same time bar the trucker from access to the general merchandise within the store, it has been proposed to provide some form of enclosure to surround the entrance, within the store, and capable of being erected when the store is closed for the night and taken down when the store is opened in the morning. Such an enclosure is illustrated, for example, in Patent No. 1,924,963, dated August 29, 1933.

The primary object of the present invention is an enclosure of the foregoing general character, which is highly effective from the standpoint of being tamper-proof and which is nevertheless so organized and arranged that it can be put up and taken down in a remarkably short time.

With the foregoing and other objects in view, as will hereinafter appear, the invention comprises the devices, combinations and arrangements of parts hereinafter set forth and illustrated in the accompanying drawings of a preferred form and an alternative embodiment of the invention, from which the several features of the invention and the advantages attained thereby will be readily understood by those skilled in the art.

In the drawings:

Fig. 4 is an enlarged sectional view on the line IV—IV of Fig. 2;

Fig. 5 is an enlarged sectional view on the line V—V of Fig. 2;

Fig. 9 is an enlarged detail of a portion of one of the closets;

Fig. 10 is a perspective view of a similar but modified installation adapted to incorporate a removable ceiling section for the enclosure;

Fig. 13 is an enlarged sectional view on the line XIII—XIII of Fig. 12.

Figure 1:
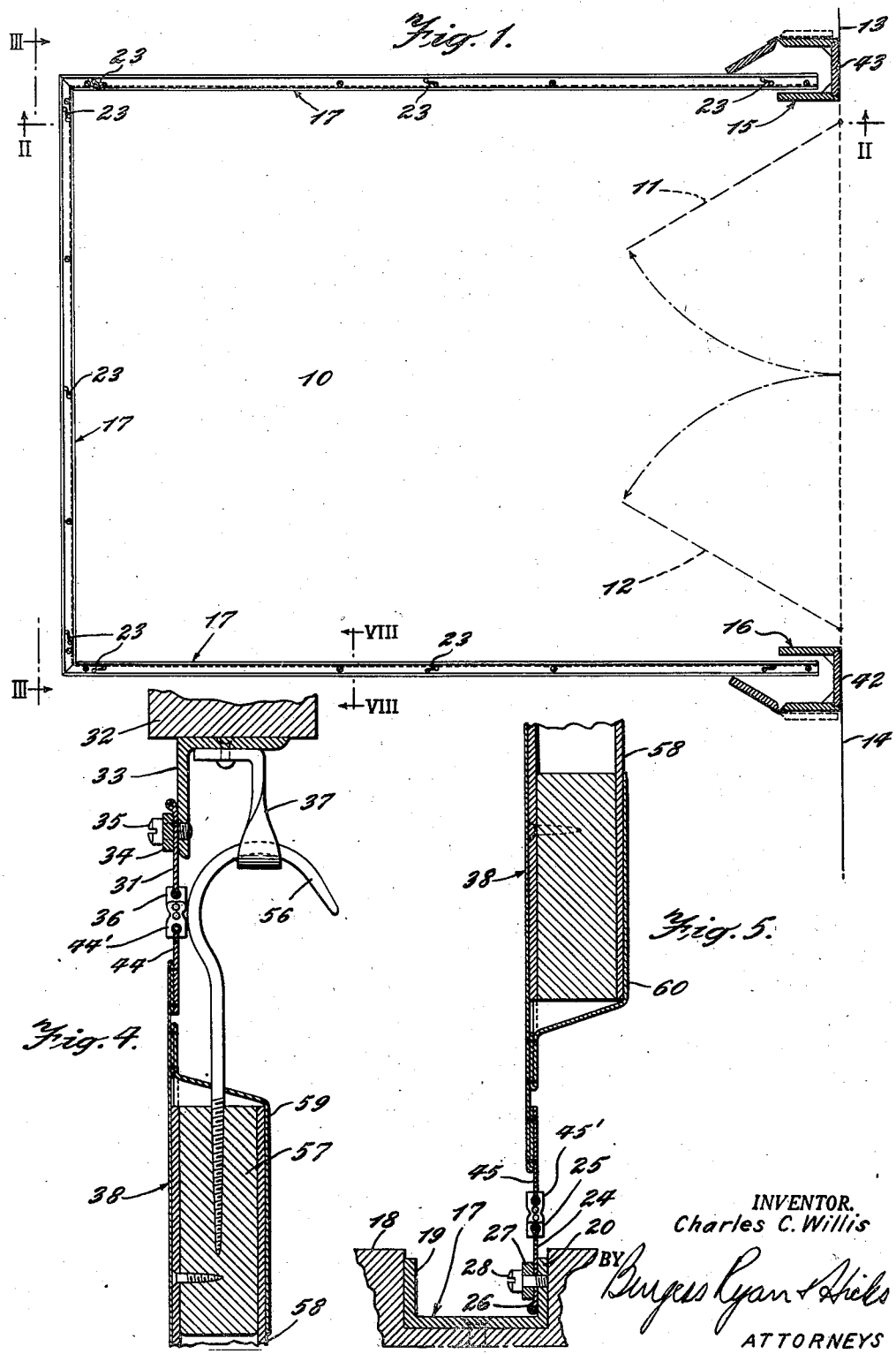
Fig. 1 is a floor plan of a typical enclosure installation according to the invention.

Referring first to Fig. 1 of the drawings, the generally rectangular space 10 represents the floor area to be enclosed inside and immediately adjacent a store entrance, the latter being indicated diagrammatically as including two inwardly-opening doors 11 and 12. On both sides of the entrance and backed up to the walls 13, 14 are closets 15, 16 in which the fabric side walls of the enclosure are conveniently anchored, as presently described, and in which they are stored when not in use. Secured to the floor of the store and extending from inside one of the closets, around the area to be enclosed and into the inside of the other closet, is a continuous channel, generally designated 17.

Figure 2:
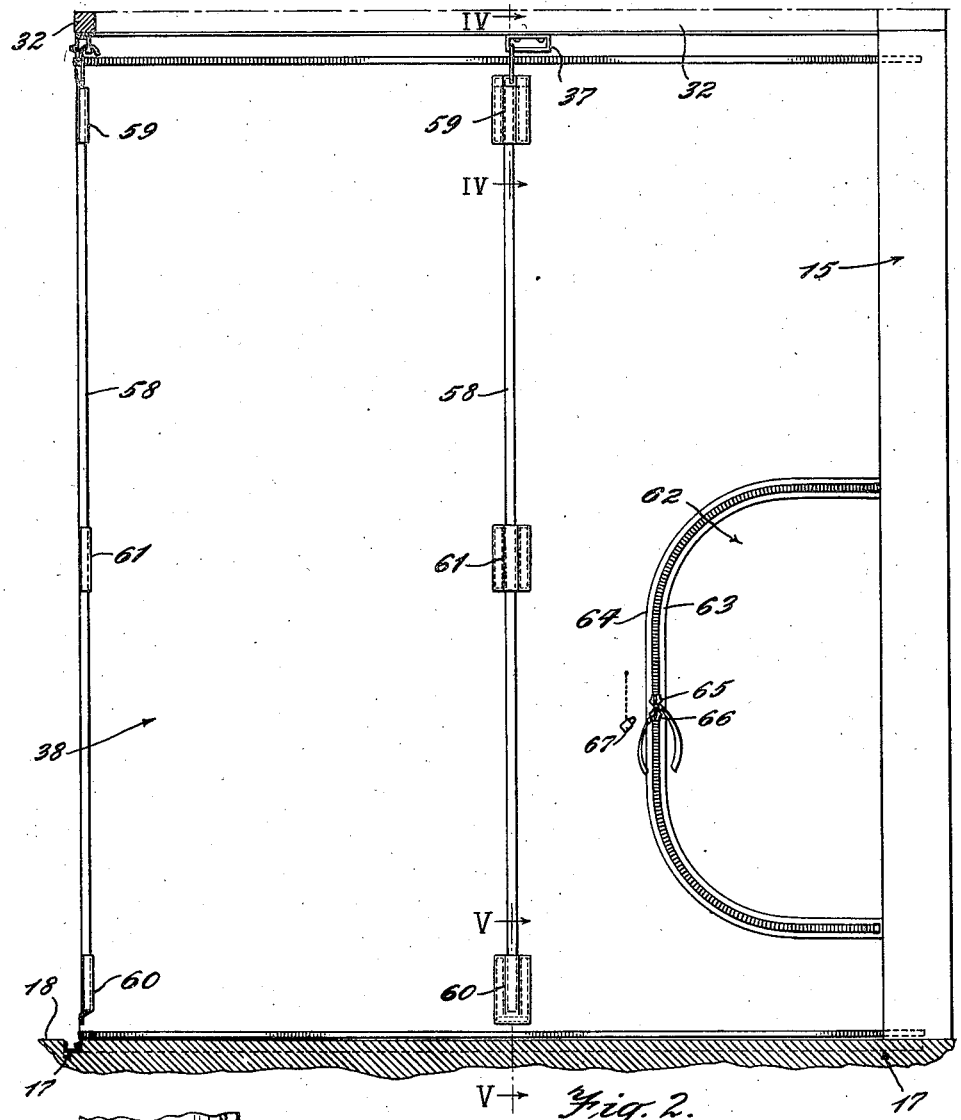
Fig. 2 is an elevational view, partially sectioned, of the "enclosure side" of one of the enclosure side walls, i. e. viewed as in the direction of the arrows II—II of Fig. 1.
Figure 6:
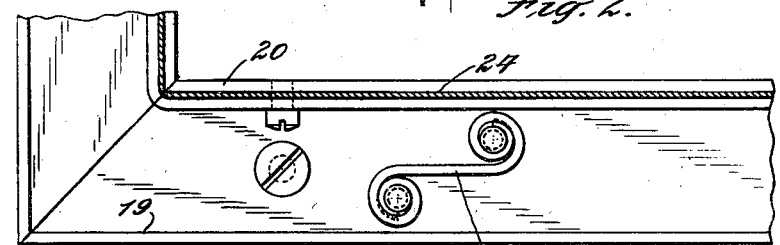
Fig. 6 is an enlarged plan view, sectioned through the fastener stringer, of a portion of the floor channel of the installation.
Figure 3:
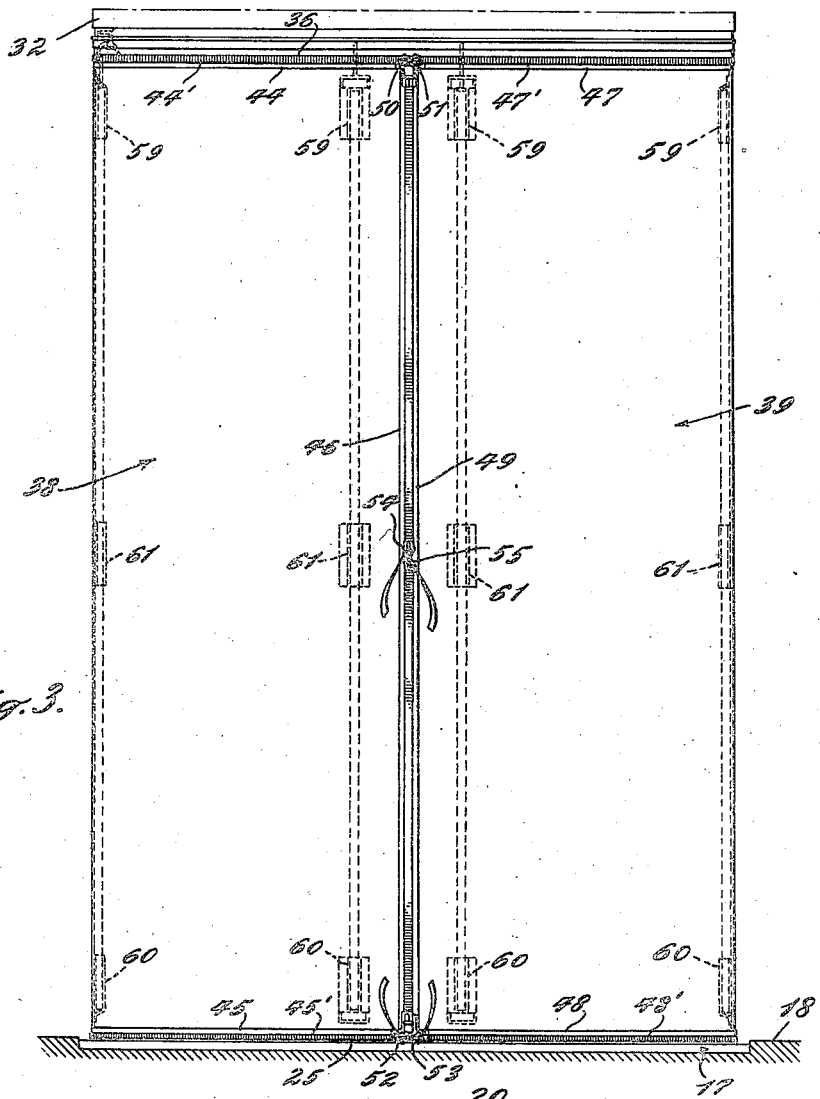
Fig. 3 is an elevational view of the "store side" of the end wall of the enclosure, i. e. viewed as in the direction of the arrows III—III of Fig. 1.
Figure 8:
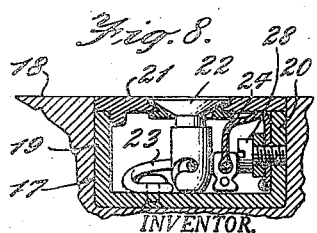
Fig. 8 is an enlarged section as on the line VIII—VIII of Fig. 1 but showing the channel cover in position.

As shown in Figs. 2, 5, and 8, the channel 17 is set into the floor 18 with the upper edges of its arms 19, 20 below the floor level so as to support, flush with the floor, a cover plate 21 (Fig. 8). Means are provided for removably securing the cover plate to the channel, such as the indicated Dzus-type fasteners of which the rotatable stud elements 22 are secured to the cover plate at spaced intervals and the cooperating locking bar elements 23 are secured to the bottom of the channel 17.

Figure 7:
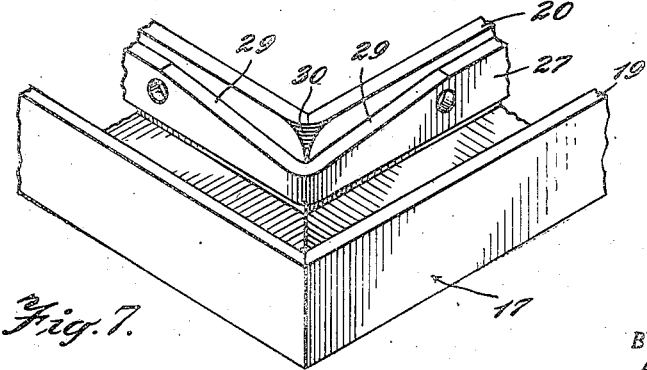
Fig. 7 is an enlarged perspective view of a corner of the floor channel with the fastener stringer removed.

Extending throughout the entire length of the channel 17, from closet to closet, and suitably secured to it, is a slide fastener stringer 24 (carrying fastener elements 25 of any suitable design) and herein referred to as the floor fastener stringer. It is of no consequence, of course, whether this stringer is actually made as one continuous length or for convenience made as two or more separate, adjoining lengths. This stringer is formed with a beaded edge 26 which serves to lock the stringer securely against removal when clamped against the channel arm 20 by plates 27 and screws 28. The flexible stringer 24 is clamped against the inner side of channel 17, i. e. the side toward the enclosure, so that the screws 28 are accessible from the outside rather than the inside of the enclosure, as will be apparent; and, as shown in Fig. 8, the stringer, including its fastener elements, is arranged to be folded over into and accommodated wholly within the channel when the cover plate 21 is applied, so that the stringer is out of the way and protected when not in use. To facilitate the folding over of the stringer at the corners of the channel and minimize wear, the clamping plate 27 is preferably cut away, as indicated at 29 in Fig. 7, and the corner or juncture of the channel arms 20 is beveled, as at 30.

A corresponding overhead fastener stringer 31 is provided, referred to for convenience as suspended from the ceiling of the store, but, as will be understood, the specific manner of supporting the overhead stringer will be varied to suit the conditions at hand.

For purposes of illustration in connection with the particular installation of Figs. 1 to 9, a frame member 32 is shown extending, like the channel member 17, from closet to closet and outlining the area to be enclosed. In a low-ceiling store, the frame member 32 may be fastened directly to the ceiling beams. Secured to the underside of the frame member 32 is an angle iron 33 and the overhead fastener stringer 31 is secured to the depending flange of the angle iron by clamping plates 34 and screws 35. As with the screws 28, the screws 35 are arranged to be accessible only from the outside, i. e. the store side, of the enclosure rather than from within the enclosure. In Fig. 4, the fastener elements of the stringer 31 are designated 36. At suitable intervals throughout the length of the angle iron 33 brackets 37 are affixed to the underside of the angle iron.

As will be recognized, the structure as thus far described may be permanently installed within the store, the various elements being so arranged and located as not to be obtrusive or in any way interfere with the normal use of the store facilities. As will also be understood, these several elements can readily be modified to provide an enclosure area of whatever shape or dimensions best fits the needs or structural characteristics of the particular store.

The walls for the enclosure are of any suitable fabric or like material, preferably a stout canvas, and comprise one or more curtains adapted for assembly on the floor and overhead fastener stringers. In this instance two such curtains 38 and 39 are shown, each serving as a side wall for one-half of the enclosure.

As shown in the enlarged view Fig. 9, one of the vertical edges of curtain 39 is permanently secured, as by clamping plate 40 and screws 41, to the rear wall 42 of closet 16; and the curtain 38 is similarly secured to the rear wall 43 (Fig. 1) of closet 15. Along the upper, lower and free edges of curtain 38 are secured fastener stringers 44, 45, and 46, respectively; and along the upper, lower, and free edges of curtain 39 are secured fastener stringers 47, 48, and 49, respectively. As will be understood, the fastener elements 44' and 47' of the upper edges of the curtains are designed to cooperate with the fastener elements 36 of the overhead stringer 31, the fastener elements 45' and 48' of the lower edges of the curtains to cooperate with the fastener elements 25 of the floor stringer 24, and the fastener elements of the stringers 46 and 49 on the free edges of the curtains to cooperate with each other. Sliders 50 and 51 are provided for coupling and uncoupling the overhead stringers, sliders 52 and 53 for the floor stringers, and sliders 54 and 55 for the free edge stringers.

It will be recognized that by having the overhead and floor stringers extend clear into the two closets, the secured ends of the curtains, adjacent their attachment to the closet walls, can be permanently coupled to the respective overhead and floor stringers and the curtains stacked in their respective closets, preferably and conveniently in a vertical roll form, when not in use.

Each curtain is provided with means for suspending it from the ceiling or overhead member independently of the fastener stringers and in the form illustrated such means comprises a series of spaced hooks 56 for engagement with the brackets 37. As shown particularly in Figs. 4 and 5, the hooks are screwed into plugs 57 inserted in the upper ends of spaced tubes 58 secured to the curtains by having their upper and lower ends enclosed in suitable pockets 59, 60. Intermediate straps 61 (Figs. 2 and 3) serve to tie the curtains more securely to the tubes, the latter serving not only as supports for the hooks 56, but also to facilitate rolling up the curtains when not in use and to impart a certain degree of rigidity to the extended curtains.

From the foregoing it will be apparent that to assemble the enclosure each curtain in turn is unrolled from within its closet and each hook 56, in turn, is hung over a bracket 37 until both curtains are entirely suspended around the enclosure with their free edges approximately meeting. It will be noted that the hooks and brackets are on the inside of the enclosure, which is the preferred arrangement, so that some or all of the above-mentioned fastener sliders can be mounted (as shown), and operated to couple the several stringers, from the outside, i. e. the store side, of the enclosure. After the stringers have been coupled, their sliders can be locked together in any convenient manner, i. e. the slider 50 to the slider 51, the slider 52 to the slider 53, and the slider 54 to the slider 55.

If, as is preferred and illustrated, the described sliders are all operated and locked from the outside or storeside of the enclosure, and if also it is desired to have the attendant erecting the enclosure leave the store by the main entrance, i. e. through the doors 11, 12, an exit opening is provided arranged to be closed and locked from within the enclosure. Such an opening is indicated in Fig. 2 as controlled by a flap 62 forming a part of curtain 38 and bordered by fastener stringer 63 having fastener elements adapted to be coupled to and uncoupled from corresponding fastener elements of a stringer 64 secured to the body of the curtain. These stringers are shown as controlled by sliders 65, 66 which can be locked together by a padlock 67 when in the stringer-coupling position.

In Figs. 10–13 there is illustrated a modified form of installation in which the enclosure incorporates its own roof or ceiling, such an arrangement being desirable where the store has a high ceiling of its own, i. e. too high to permit the overhead stringers to be conveniently coupled and uncoupled if the curtains are hung directly from the ceiling itself. In such a modified installation it is not essential that the enclosure ceiling be removable, as well as the wall curtains, but in some instances that is preferred; and since the present invention lends itself readily to such preferred arrangement, the ceiling closure of Figs. 10–13 is shown as of that form.

Referring first to Fig. 10, a floor channel 68 is indicated as outlining the enclosure area, as before, and extending from one side closet 69 to the other side closet 70. The floor stringer arrangement and the mounting of the curtain ends within the closets may be just as above described in connection with the showing of Figs. 1–9.

In this instance there is also a top closet 71 bridging the upper ends of the side closets across the top of the store entrance; and extending into the store from this closet structure is an overhead frame 72 arranged directly above the floor channel 68 and suspended from the store ceiling as by hangers 73. As shown in detail in Fig. 13, the frame 72 may conveniently be formed from a T-bar, the horizontal webs of which are supported in brackets 74 secured by bolts 75 to the hangers 73.

Secured to the depending web of frame bar 72 by clamping plates 85 and bolts 76 is an overhead fastener stringer 77 for supporting side wall curtains 78, 79 in the manner already described. As shown in Fig. 13, the curtain 78 (and the arrangement is the same for curtain 79) is provided along its upper edge with a fastener stringer 80. The side wall curtains are thus manipulated just as above described.

In this form, loops 82 on which the hooks 81 are hung are suspended by straps 83 secured to a second overhead stringer or ceiling stringer 84 which is in turn secured to the frame bar 72 by clamping plates 85 and bolts 76. Like the stringer 77, the stringer 84 extends from closet to closet entirely around the overhead frame. To cooperate with the ceiling stringer 84 there is provided a stringer 86 which borders a ceiling curtain 87, one end of which is secured to the rear wall of the top closet 71 as indicated at 88 in Fig. 12. Suitable sliders (not shown) are provided for coupling and locking and uncoupling the fastener elements of stringers 84 and 86.

Figure 11:
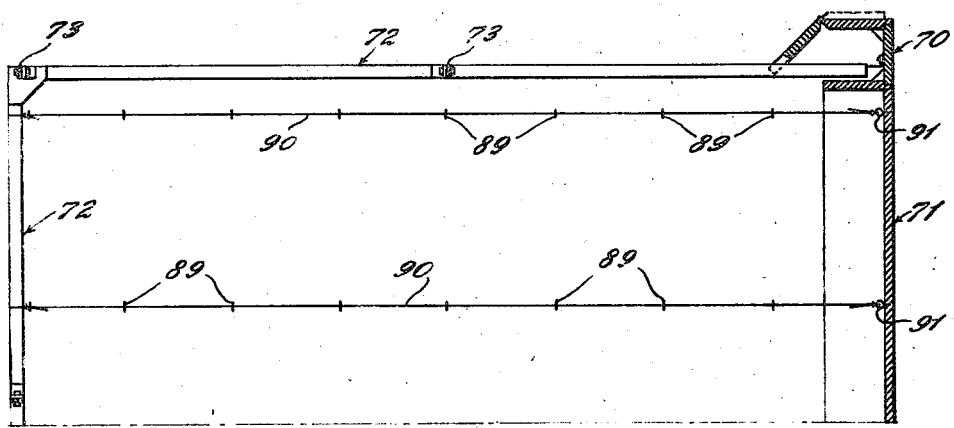
Figs. 11 and 12 are broken-out plan and elevational views, respectively, of the modified installation.
Figure 12:
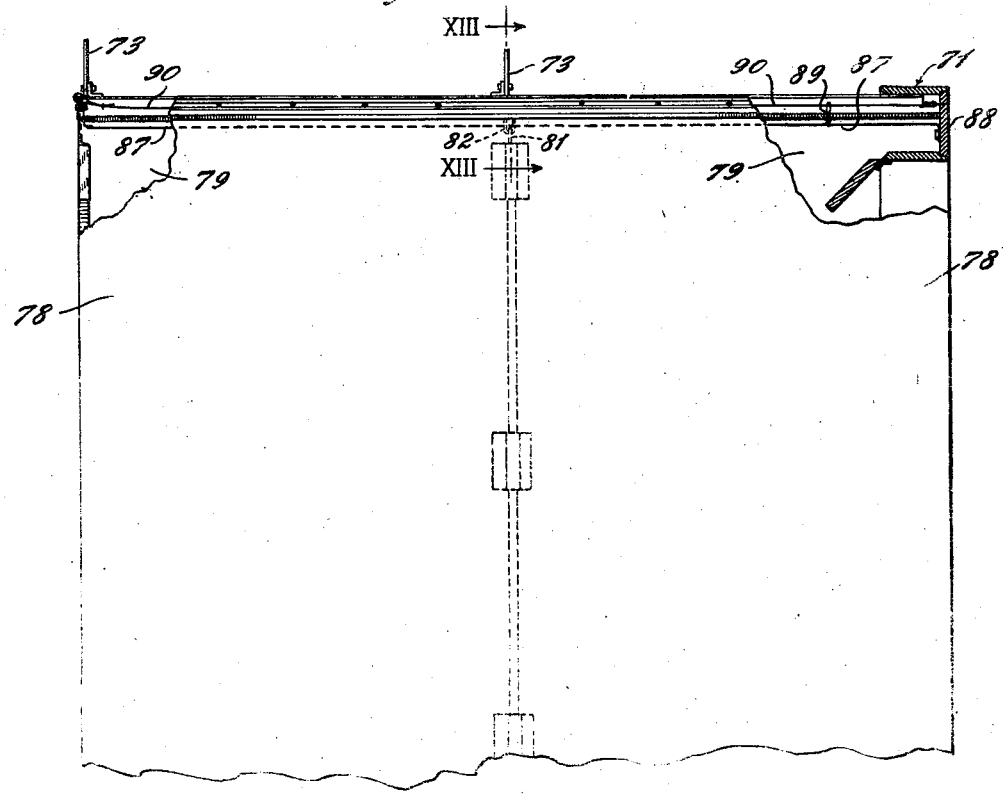

To facilitate the handling of the ceiling curtain 87, several rows of rings 89 are attached to the upper side of this curtain and supported on wires 90 secured at one end to the eyes 91 in the rear wall of the top closet 71 and at the other end to the frame bar 72 (Figs. 11 and 12). By means of the wires 90 and rings 89 (which serve a similar purpose to the loops 82 and hooks 81 of the side wall curtains) the ceiling curtain 87 is arranged to be supported in its extended position independently of the stringers 84, 86, thereby making it a very simple matter to couple and uncouple the stringers. As will be understood, the ceiling curtain is slid back along the wires 90 into and is stored in the top closet 71 when not in use. In erecting this modified form of enclosure the ceiling curtain is first withdrawn from its closet 71 and spread over the enclosure area to the far end of the overhead frame and its stringer 86 is then coupled with the stringer 84. From then on, the erection of the side wall curtains follows the procedure already described with reference to the first form.

In the light of the foregoing description the following is claimed:

1. Enclosure means of the character described comprising in combination: a closet structure on each side of an entrance into a room and of a height at least equal to that of the entrance; a channel set into the floor of the room and extending from the inside of one closet to the inside of the other closet and outlining the area to be enclosed; a flexible floor fastener stringer secured to said channel below the floor level and adapted to be bodily folded into the channel, said stringer extending throughout the length of the channel from closet to closet; an overhead fastener stringer suspended from the ceiling of the room and likewise extending from closet to closet around the area to be enclosed; a curtain having one vertical edge thereof secured within one of said closets, and fastener stringers on its upper and lower edges for engagement, respectively, with the said overhead and with the said floor fastener stringers; a second and similarly fastener-equipped curtain having one vertical edge secured within the other of said closets; co-operating fastener stringers on the free vertical edges of the two curtains; sliders for coupling and uncoupling the said stringers located for operation from the outside of the enclosed area; means secured to the curtains for suspending the same from the ceiling independently of the said overhead stringers; and a fastener-controlled opening in one of the curtains having a slider therefor located for operation from the inside of the enclosed area.

2. Enclosure means of the character described comprising in combination: a closet structure on each side of an entrance into a room and of a height at least equal to that of the entrance; a channel set into the floor of the room and extending from the inside of one closet to the inside of the other closet and outlining the area to be enclosed; a flexible floor fastener stringer secured to said channel below the floor level and adapted to be bodily folded into the channel, said stringer extending throughout the length of the channel from closet to closet; an overhead fastener stringer suspended from the ceiling of the room and likewise extending from closet to closet around the area to be enclosed; a curtain having one vertical edge thereof secured within one of said closets, and fastener stringers on its upper and lower edges for engagement, respectively, with the said overhead and with the said floor fastener stringers; a second and similarly fastener-equipped curtain having one vertical edge secured within the other of said closets; cooperating fastener stringers on the free vertical edges of the two curtains; sliders for coupling and uncoupling the said stringers; and means secured to the curtains for suspending the same from the ceiling independently of the said overhead stringers.

3. Enclosure means of the character described comprising in combination: a closet structure on each side of an entrance into a room and of a height at least equal to that of the entrance; a channel set into the floor of the room and extending from the inside of one closet to the inside of the other closet and outlining the area to be enclosed; a flexible floor fastener stringer secured to said channel below the floor level and adapted to be bodily folded into the channel, said stringer extending throughout the length of the channel from closet to closet; an overhead fastener stringer suspended from the ceiling of the room and likewise extending from closet to closet around the area to be enclosed; a curtain having one vertical edge thereof secured within one of said closets, and fastener stringers on its upper and lower edges for engagement, respectively, with the said overhead and with the said floor fastener stringers; a second and similarly fastener-equipped curtain having one vertical edge secured within the other of said closets; cooperating fastener stringers on the free vertical edges of the two curtains; and sliders for coupling and uncoupling the said stringers.

4. Enclosure means of the character described comprising in combination: a closet structure on each side of an entrance into a room and of a height at least equal to that of the entrance; a channel set into the floor of the room and extending from the inside of one closet to the inside of the other closet and outlining the area to be enclosed; a flexible floor fastener stringer secured to said channel below the floor level and adapted to be bodily folded into the channel, said stringer extending throughout the length of the channel from closet to closet; an overhead fastener stringer suspended from the ceiling of the room and likewise extending from closet to closet around the area to be enclosed; a curtain having one vertical edge thereof secured within one of said closets, and fastener stringers on its upper and lower edges for engagement, respectively, with the said overhead and with the said floor fastener stringers; sliders for coupling and uncoupling the said stringers; means secured to the curtain for suspending the same from the ceiling independently of the said overhead stringers; and means for securing the free vertical edge of the curtain to complete the enclosure.

5. Enclosure means of the character described comprising in combination: a closet structure on each side of an entrance into a room and of a height at least equal to that of the entrance; a channel set into the floor of the room and extending from the inside of one closet to the inside of the other closet and outlining the area to be enclosed; a flexible floor fastener stringer secured to said channel below the floor level and adapted to be bodily folded into the channel, said stringer extending throughout the length of the channel from closet to closet; an overhead fastener stringer suspended from the ceiling of the room and likewise extending from closet to closet around the area to be enclosed; a curtain having one vertical edge thereof secured within one of said closets, and fastener stringers on its upper and lower edges for engagement, respectively, with the said overhead and with the said floor fastener stringers; sliders for coupling and uncoupling the said stringers; and means for securing the free vertical edge of the curtain to complete the enclosure.

6. Enclosure means of the character described comprising in combination: a channel set into the floor of a room and extending from adjacent the room wall on one side of an entrance into a room to adjacent the room wall on the other side of the entrance and outlining the area to be enclosed; a flexible floor fastener stringer secured to said channel below the floor level and adapted to be bodily folded into the channel, said stringer extending throughout the length of the channel; an overhead fastener stringer suspended from the ceiling of the room and likewise extending from wall to wall around the area to be enclosed; a curtain having fastener stringers on its upper and lower edges for engagement, respectively, with the said overhead and with the said floor fastener stringers; sliders for coupling and uncoupling the said stringers; and means for securing the vertical edges of the curtain to complete the enclosure.

7. In a structure of the kind described, the combination of an overhead member surrounding the area to be enclosed; a fastener stringer secured to said member and a curtain having a cooperating fastener stringer secured to the upper edge thereof; means located on one side of the curtain for suspending the same from the said overhead member independently of the stringer fasteners; and a slider operable from the other side of the curtain for coupling and uncoupling the fasteners of the two stringers while the curtain is so suspended.

8. The combination of claim 7 in which the said means comprises a plurality of spaced, rigid members extending substantially from top to bottom of and secured to the curtain, a hook projecting from the upper part of each such rigid member and adapted to be engaged with the overhead member.

9. In a structure of the kind described, the combination of an overhead member surrounding the area to be enclosed; a fastener stringer secured to said member and a curtain having a cooperating fastener stringer secured to the upper edge thereof; means for suspending the curtain from said overhead member; and slider means operable to couple and uncouple the said stringers while the curtain is suspended by the said means.

10. In a structure of the kind described, the combination of a channel member set into a floor with the upper edges of its arms below the floor level, a closure plate for the channel adapted to seat on said edges with its upper surface flush with the floor, a flexible fastener stringer having a beaded edge and fastener elements secured to its other edge, a clamping plate adapted to secure the beaded edge of the stringer to one arm of the channel, the remainder of the stringer and the fasteners thereon being foldable into the channel, and means for releasably locking the closure plate to the channel.

11. In a structure of the kind described, the combination of a channel member set into a floor with the upper edges of its arms below the floor level, a closure plate for the channel adapted to seat on said edges with its upper surface flush with the floor, a flexible fastener stringer, a clamping plate adapted to secure the stringer adjacent one edge thereof to one arm of the channel, the remainder of the stringer and the fasteners thereon being foldable into the channel, and means for releasably locking the closure plate to the channel.

12. In a structure of the kind described, the combination of a channel member set into a floor with the upper edges of its arms below the floor level, a closure plate for the channel adapted to seat on said edges with its upper surface flush with the floor, a flexible fastener stringer, clamping means adapted to secure the stringer adjacent one edge thereof to the channel, the remainder of the stringer and the fasteners thereon being foldable into the channel, and means for releasably locking the closure plate to the channel.

13. In a structure of the kind described, the combination of a channel member set into a floor, a closure plate for the channel, a flexible fastener stringer, clamping means adapted to secure the stringer adjacent one edge thereof to the channel, the remainder of the stringer and the fasteners thereon being foldable into the channel, and means for releasably locking the closure plate to the channel.

14. In a structure of the kind described, the combination of a floor fastener stringer bordering the floor area to be enclosed, an overhead member supported independently of the floor and likewise bordering the area to be enclosed, an overhead fastener stringer secured to said overhead member, and a curtain having lower and upper fastener stringers to cooperate respectively with said floor and overhead fastener stringers.

15. The combination of claim 14 including a second overhead stringer secured to said overhead member, and a ceiling curtain having a supporting fastener stringer to cooperate with said second overhead stringer.

16. In a structure of the kind described, the combination of a floor fastener stringer bordering the floor area to be enclosed, an overhead member supported independently of the floor and likewise bordering the area to be enclosed, an overhead fastener stringer secured to said overhead member, a curtain having lower and upper fastener stringers to cooperate respectively with said floor and overhead fastener stringers, a second overhead stringer secured to said overhead member, a ceiling curtain having a supporting fastener stringer to cooperate with said second overhead stringer, a fixed support for one end of said ceiling curtain, supporting wires extending from such fixed support to a portion of said overhead member remote from the said fixed support, and means connecting the ceiling curtain to the supporting wires.

17. In a structure of the kind described, the combination of a floor fastener stringer bordering the floor area to be enclosed, an overhead member supported independently of the floor and likewise bordering the area to be enclosed, an overhead fastener stringer secured to said overhead member, a curtain having lower and upper fastener stringers to cooperate respectively with said floor and overhead fastener stringers, a second overhead stringer secured to said overhead member, a ceiling curtain having a supporting fastener stringer to cooperate with said second overhead stringer, a fixed support for one end of said ceiling curtain, and supporting means for the last-mentioned curtain extending from such fixed support to a portion of said overhead member remote from the said fixed support.

18. In a structure of the kind described, the combination of a floor fastener stringer bordering the floor area to be enclosed, an overhead member supported independently of the floor and likewise bordering the area to be enclosed, an overhead fastener stringer secured to said overhead member, a curtain having lower and upper fastener stringers to cooperate respectively with said floor and overhead fastener stringers, a second overhead stringer secured to said overhead member, a ceiling curtain having a supporting fastener stringer to cooperate with said second overhead stringer, a second overhead stringer secured to said overhead member, a ceiling curtain having a supporting fastener stringer to cooperate with said second overhead stringer and means secured to said overhead member for supporting the body of the ceiling curtain independently of its said supporting fastener stringer.

CHARLES C. WILLIS.